US007570198B2

(12) United States Patent
Tokoro

(10) Patent No.: US 7,570,198 B2
(45) Date of Patent: Aug. 4, 2009

(54) OBSTACLE RECOGNITION SYSTEM AND OBSTACLE RECOGNITION METHOD

(75) Inventor: Setsuo Tokoro, Aichi (JP)

(73) Assignee: Toyota Jidosha Kabushiki Kaisha, Toyota-Shi, Aichi-Ken (JP)

(*) Notice: Subject to any disclaimer, the term of this patent is extended or adjusted under 35 U.S.C. 154(b) by 34 days.

(21) Appl. No.: 11/142,244

(22) Filed: Jun. 2, 2005

(65) Prior Publication Data
US 2005/0270225 A1 Dec. 8, 2005

(30) Foreign Application Priority Data
Jun. 2, 2004 (JP) ............................ P2004-164977

(51) Int. Cl.
G01S 13/00 (2006.01)
G06K 9/00 (2006.01)

(52) U.S. Cl. ...................... 342/70; 342/71; 382/103
(58) Field of Classification Search .................. 342/70, 342/71; 382/103
See application file for complete search history.

(56) References Cited

U.S. PATENT DOCUMENTS

| 6,025,796 | A | * | 2/2000 | Crosby, II | 342/70 |
| 6,028,548 | A | * | 2/2000 | Farmer | 342/70 |
| 6,488,109 | B1 | * | 12/2002 | Igaki et al. | 180/169 |
| 6,580,385 | B1 | | 6/2003 | Winner et al. | |
| 2001/0031068 | A1 | * | 10/2001 | Ohta et al. | 382/103 |
| 2003/0182041 | A1 | * | 9/2003 | Watson | 701/45 |
| 2003/0217880 | A1 | * | 11/2003 | Isogai et al. | 180/170 |
| 2003/0235327 | A1 | * | 12/2003 | Srinivasa | 382/104 |
| 2004/0080449 | A1 | * | 4/2004 | Horibe | 342/70 |
| 2004/0080450 | A1 | * | 4/2004 | Cheong | 342/118 |
| 2004/0246167 | A1 | * | 12/2004 | Kumon et al. | 342/70 |
| 2004/0254729 | A1 | * | 12/2004 | Browne et al. | 701/301 |
| 2005/0134440 | A1 | * | 6/2005 | Breed | 340/435 |
| 2005/0270225 | A1 | * | 12/2005 | Tokoro | 342/70 |

FOREIGN PATENT DOCUMENTS

| GB | 2 394 076 A | 4/2004 |
| JP | 9-264954 | 10/1997 |
| JP | 2001-27670 | 1/2001 |
| JP | 2001-296357 | 10/2001 |
| JP | 2004-144671 | 5/2004 |

OTHER PUBLICATIONS

Patent Abstracts of Japan, vol. 2002, No. 2, JP 2001 296357 A (Oct. 26, 2001).
European Search Report dated Aug. 17, 2005.

* cited by examiner

Primary Examiner—Thomas H Tarcza
Assistant Examiner—Harry Liu
(74) Attorney, Agent, or Firm—Finnegan, Henderson, Farabow, Garrett & Dunner, LLP

(57) ABSTRACT

The present invention relates to an obstacle recognition system and an obstacle recognition method. A radar detects existence of an object around a vehicle, an image taking part such as a camera takes an image of the object around the vehicle, a determination threshold is set at a low value when it is determined based on image information of the photographic image that a possibility of presence of an obstacle is high, the determination threshold is set at a high value when it is determined that the possibility of the presence of the obstacle is low, and these determination threshold values are used to detect the obstacle to travel of the vehicle on the basis of the output from the radar.

25 Claims, 7 Drawing Sheets

OBSTACLE RECOGNITION SYSTEM AND OBSTACLE RECOGNITION METHOD

BACKGROUND OF THE INVENTION

1. Field of the Invention

The present invention relates to an obstacle recognition system and an obstacle recognition method for effecting recognition of an obstacle to vehicle travel.

2. Related Background of the Invention

An example of the conventionally known obstacle recognition systems is one having a millimeter wave radar and an image acquiring means, as described in Japanese Patent Application Laid-Open No. 2001-296357. This system is configured to specify an image recognition area on the basis of the power from the millimeter wave radar, to execute image processing for detection of an object within the limited image recognition area thus specified, and thereby to reduce the time of the image processing.

SUMMARY OF THE INVENTION

However, this system has a problem that appropriate obstacle recognition is not performed. For example, where there exists an object with low reflection of waves, the millimeter wave radar fails to perform accurate recognition of the object. In a reverse case where there exists an object with large reflection of waves, the object, such as a metal bump on a road, poses no serious impediment to vehicle travel in some situations, and it makes appropriate recognition of an obstacle difficult.

An object of the present invention is therefore to provide an obstacle recognition system and an obstacle recognition method capable of performing appropriate recognition of an obstacle.

Namely, an obstacle recognition system according to the present invention comprises a radar for detecting existence of an object around a vehicle, image taking means for taking an image of the object, obstacle detecting means for detecting an obstacle to travel of the vehicle on the basis of an output from the radar, and criterion value changing means for changing a criterion value in the obstacle detection of the obstacle detecting means on the basis of image information of the image taken by the image taking means.

The obstacle recognition system according to the present invention is characterized in that the system further comprises obstacle estimating means for estimating presence of the obstacle on the basis of the image information and in that the criterion value changing means changes the criterion value on the basis of a possibility of the presence of the obstacle estimated by the obstacle estimating means.

The obstacle recognition system according to the present invention is characterized in that the obstacle estimating means sets a detection area in the image on the basis of the output from the radar, and estimates the presence of the obstacle in the detection area on the basis of the image information.

The obstacle recognition system according to the present invention is characterized in that the detection area set by the obstacle estimating means is set based on a distance from the vehicle to the object and a relative position of the object to the vehicle.

The obstacle recognition system according to the present invention is characterized in that the obstacle estimating means estimates the presence of the obstacle on the basis of an edge density distribution obtained through image processing of the image.

The obstacle recognition system according to the present invention is characterized in that the obstacle estimating means calculates a possibility of absence of the obstacle on the basis of entire edge data obtained through image processing of a predetermined region in the image, calculates the possibility of the presence of the obstacle on the basis of edge data resulting from subtraction of edge data of lane markers from the entire edge data, and estimates the presence of the obstacle on the basis of the possibility of the absence of the obstacle and the possibility of the presence of the obstacle.

The obstacle recognition system according to the present invention is characterized in that the criterion value changing means changes the criterion value so that the obstacle becomes less likely to be detected as the possibility of the absence of the obstacle is estimated to be higher based on the image information.

The obstacle recognition system according to the present invention is characterized in that the criterion value changing means changes the criterion value so that the obstacle becomes more likely to be detected as the possibility of the presence of the obstacle is estimated to be higher based on the image information.

An obstacle recognition method according to the present invention comprises a criterion value changing step of changing a criterion value in obstacle detection on the basis of image information of an image taken by an image taking device for taking an image around a vehicle; and an obstacle detecting step of detecting an obstacle to travel of the vehicle on the basis of an output from a radar for detecting existence of an object by use of the criterion value set in the criterion value changing step.

The obstacle recognition method according to the present invention is characterized in that the method further comprises an obstacle estimating step of estimating presence of the obstacle on the basis of the image information and in that the criterion value changing step comprises changing the criterion value on the basis of a possibility of the presence of the obstacle estimated in the obstacle estimating step.

The obstacle recognition method according to the present invention is characterized in that the obstacle estimating step comprises setting a detection area in the image on the basis of the output from the radar and estimating the presence of the obstacle in the detection area on the basis of the image information.

The obstacle recognition method according to the present invention is characterized in that the detection area in the obstacle estimating step is set based on a distance from the vehicle to the object and a relative position of the object to the vehicle.

The obstacle recognition method according to the present invention is characterized in that the obstacle estimating step comprises estimating the presence of the obstacle on the basis of an edge density distribution obtained through image processing of the image.

The obstacle recognition method according to the present invention is characterized in that the obstacle estimating step comprises calculating a possibility of absence of the obstacle on the basis of entire edge data obtained through image processing of a predetermined region in the image, calculating a possibility of presence of the obstacle on the basis of edge data resulting from subtraction of edge data of lane markers from the entire edge data, and estimating the presence of the obstacle on the basis of the possibility of absence of the obstacle and the possibility of presence of the obstacle.

The obstacle recognition method according to the present invention is characterized in that the criterion value changing step comprises changing the criterion value so that the obstacle becomes less likely to be detected as the possibility of absence of the obstacle is estimated to be higher based on the image information.

The obstacle recognition method according to the present invention is characterized in that the criterion value changing step comprises changing the criterion value so that the obstacle becomes more likely to be detected as the possibility of presence of the obstacle is estimated to be higher based on the image information.

According to these aspects of the invention, the criterion value in the obstacle detection is changed based on the image information and it is feasible thereby to implement the following change of the criterion value: in the obstacle detection based on the output from the radar, the criterion value is changed so that the obstacle becomes less likely to be detected as the possibility of absence of the obstacle becomes higher based on the image information; the criterion value is changed so that the obstacle becomes more likely to be detected as the possibility of presence of the obstacle becomes higher. This can prevent unwanted actuation of the system when the possibility of presence of the obstacle is low. The system can be actuated more securely when the possibility of presence of the obstacle is high. This achieves appropriate actuation of the system.

The obstacle recognition system according to the present invention is also characterized in that it further comprises collision avoiding/relieving means for avoiding a collision with the obstacle or for relieving influence of the collision and in that the collision avoiding/relieving means activates the collision avoidance or collision influence relief earlier when the obstacle estimating means estimates that the possibility of the presence of the obstacle is high, than when the possibility of the presence of the obstacle is estimated not to be high.

The obstacle recognition method according to the present invention is also characterized in that it further comprises a collision avoiding/relieving step of avoiding a collision with the obstacle or relieving influence of the collision and in that the collision avoidance or collision influence relief in the collision avoiding/relieving step is activated earlier when the obstacle estimating step results in estimating that the possibility of the presence of the obstacle is high, than when the possibility of the presence of the obstacle is estimated not to be high.

According to this invention, the collision avoidance or collision influence relief with the obstacle is activated earlier with the possibility of presence of the obstacle being high, whereby it is feasible to enhance the possibility of collision avoidance with the obstacle or to relieve influence of the collision.

Effect of the Invention

The present invention involves the execution of the obstacle detection with the radar on the basis of the image information, and thus implements appropriate recognition of the obstacle.

DESCRIPTION OF THE PREFERRED EMBODIMENTS

An embodiment of the present invention will be described below in detail with reference to the accompanying drawings. The same elements will be denoted by the same reference symbols in the description of the drawings, without redundant description.

Figure 1:
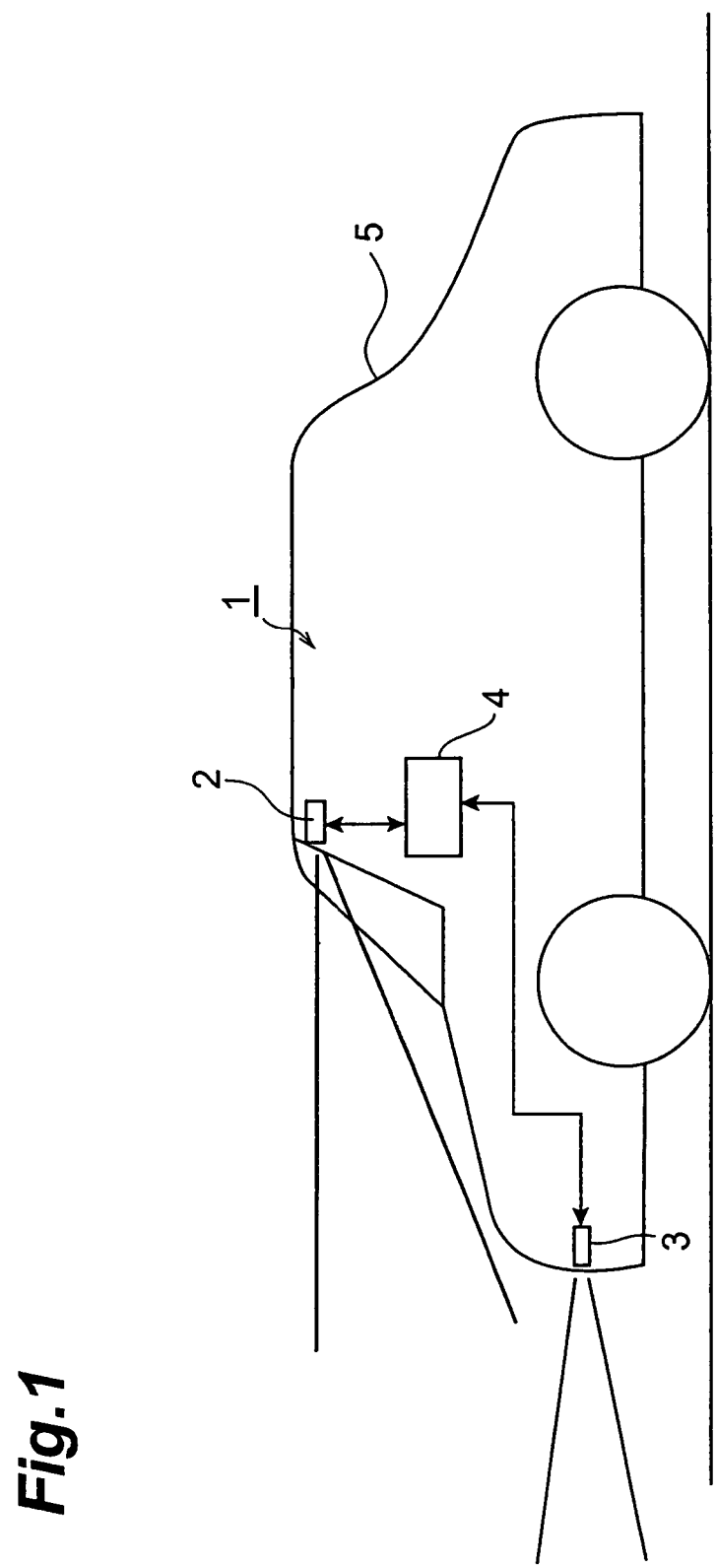
FIG. 1 is a schematic diagram of a configuration of an obstacle recognition system according to an embodiment of the present invention.

FIG. 1 is a schematic view of a configuration of an obstacle recognition system according to an embodiment of the present invention.

As shown in FIG. 1, the obstacle recognition system 1 of the present embodiment is a device mounted on a vehicle 5, and device for detecting an obstacle in front of the vehicle 5. This obstacle recognition system 1 is provided with an image taking part 2. The image taking part 2 functions as an image taking means for taking an image of an object around the vehicle, and is installed, for example, so as to take a forward image ahead the vehicle 5. This image taking part 2 is, for example, a CCD camera or a C-MOS camera.

The obstacle recognition system 1 has a radar 3. The radar 3 is a device for detecting the existence of an object around the vehicle, and is installed, for example, so as to be able to detect the existence of an object ahead the vehicle 5. The radar 3 is one configured to transmit an electromagnetic wave toward a detection area, to receive a reflected wave thereof, and to detect an object in the detection area, and is, for example, a millimeter wave radar that transmits and receives a millimeter wave. The radar 3 can be one configured to transmit and receive a wave other than electromagnetic waves and to detect an object, based thereon, and can be, for example, a laser radar for transmitting and receiving a laser beam, an acoustic wave radar for transmitting and receiving an acoustic wave, or the like.

The image taking part 2 and radar 3 are connected to an ECU (Electronic Control Unit) 4. The ECU 4 performs control over the entire system, and is comprised, for example, of a CPU, a ROM, a RAM, an input signal circuit, an output signal circuit, a power supply circuit, and so on. This ECU 4 functions as an obstacle detecting means for retrieving image information from the image taking part 2 and radar information from the radar 3 and for detecting an obstacle to vehicle travel. The ECU 4 also functions as a criterion adjusting means for adjusting a criterion value in obstacle detection processing on the basis of the image information from the image taking part 2. The ECU 4 also functions as an obstacle estimating means for estimating the presence of an obstacle on the basis of the image information.

This obstacle recognition system 1 is preferably used as a part of a vehicle driving support system for avoidance of a collision of a vehicle. This vehicle driving support system executes a warning process for issuing a warning to a driver of a vehicle, a brake preparation process for collision avoidance, and part or all of brake control for collision avoidance, based on obstacle detection information detected by the obstacle recognition system 1. By executing these processes, it is feasible to avoid a collision with an obstacle or to relieve influence of the collision with the obstacle.

The obstacle recognition system 1 is preferably installed on a vehicle in combination with the vehicle driving support system for lane keep. In this configuration, the lane keep control can be performed using the image information on lane markers among the image information obtained by the image taking part 2, and the obstacle detection can be performed using the image information except for the lane markers, thereby utilizing the image information without waste. Namely, the image information except for the lane markers, which was discarded in the lane keep control, can be effectively used, so as to implement efficient obstacle detection processing.

The operation of the obstacle recognition system and an obstacle recognition method according to the present embodiment will be described below.

Figure 2:
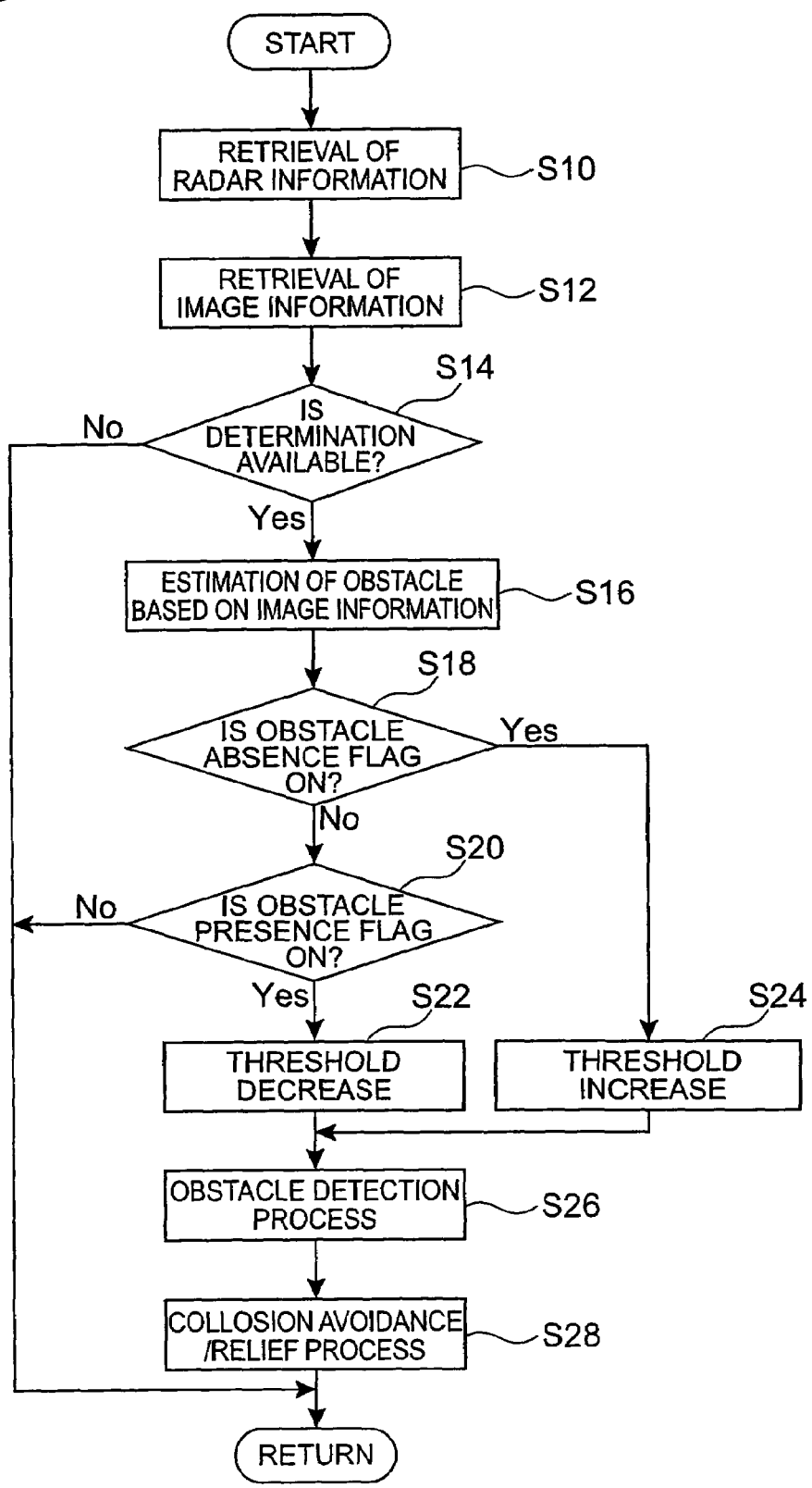
FIG. 2 is a flowchart showing an operation of the obstacle recognition system of FIG. 1 and an obstacle recognition method.

FIG. 2 is a flowchart showing the operation of the obstacle recognition system and the obstacle recognition method according to the present embodiment. FIGS. 3 to 6 are illustrations to illustrate a photographic image, arithmetic processing, etc. in the control processing of FIG. 2. The control processing in FIG. 2 is repeatedly executed in given cycles preliminarily set by the ECU 4.

First, the radar information is retrieved as at S10 in FIG. 2. This retrieval of the radar information is carried out by retrieving detected object information based on a detection signal of the radar 3. The object information based on the detection signal of the radar 3 is, for example, information about a relative distance between the vehicle and an object, a relative speed, and a direction of the object. The radar 3 performs a process of acquiring the object information about these items from the detection signal of the radar 3. The ECU 4 may be configured to perform the process of acquiring the object information about these items. For example, the ECU 4 may be arranged to receive the detection signal of the radar 3 and to perform an arithmetic operation to acquire the information about the relative distance between the vehicle and the object, the relative speed and the direction of the object on the basis of the detection signal.

Then the ECU 4 moves to S12 to retrieve the image information. This retrieval of the image information is carried out by retrieving object information detected based on the photographic image of the image taking part 2. The object information based on the photographic image of the image taking part 2 is, for example, vertical edge information obtained through edge processing of the photographic image. Specifically, it is edge density distribution information in the vertical direction within a predetermined region of the photographic image. A process of acquiring this vertical edge information is carried out by the image taking part 2. The ECU 4 may be configured to perform this process of acquiring the vertical edge information. For example, the ECU 4 may be arranged to receive the photographic image of the image taking part 2 and to perform the image processing of the photographic image to acquire the vertical edge information.

Then the ECU 4 moves to S14 to determine whether a determination on an obstacle based on image information is available. In this availableness determining process, it is determined that the obstacle determination based on the image information is not available, for example, where it is determined that the image information is not available, where a fail signal is received from the image taking part 2, where an error occurs in communication with the image taking part 2, where the vehicle speed is not more than a predetermined speed, and so on. The ECU 4 terminates the control processing when the obstacle determination is determined to be unavailable as described.

On the other hand, when it is determined at S14 that the obstacle determination is available, the ECU 4 performs an obstacle estimating process based on the image information (S16). This obstacle estimating process is a process of estimating a possibility of presence of an obstacle on a road on the basis of the image information, for example, the ECU 4 performs an obstacle absence flag operation and an obstacle presence flag operation, and estimates the possibility of the presence of the obstacle on the basis of the presence/absence of these obstacle absence flag and obstacle presence flag, or the number of flags set, or the like.

The obstacle absence flag operation is a process of computing obstacle absence flags on the basis of edge points obtained through vertical edge processing for the photographic image of the image taking part 2. An obstacle absence flag is a flag indicating a possibility of absence of an obstacle on a road on the basis of the image information. The more the obstacle absence flags are set, the higher the possibility of the absence of the obstacle is.

Figure 3:
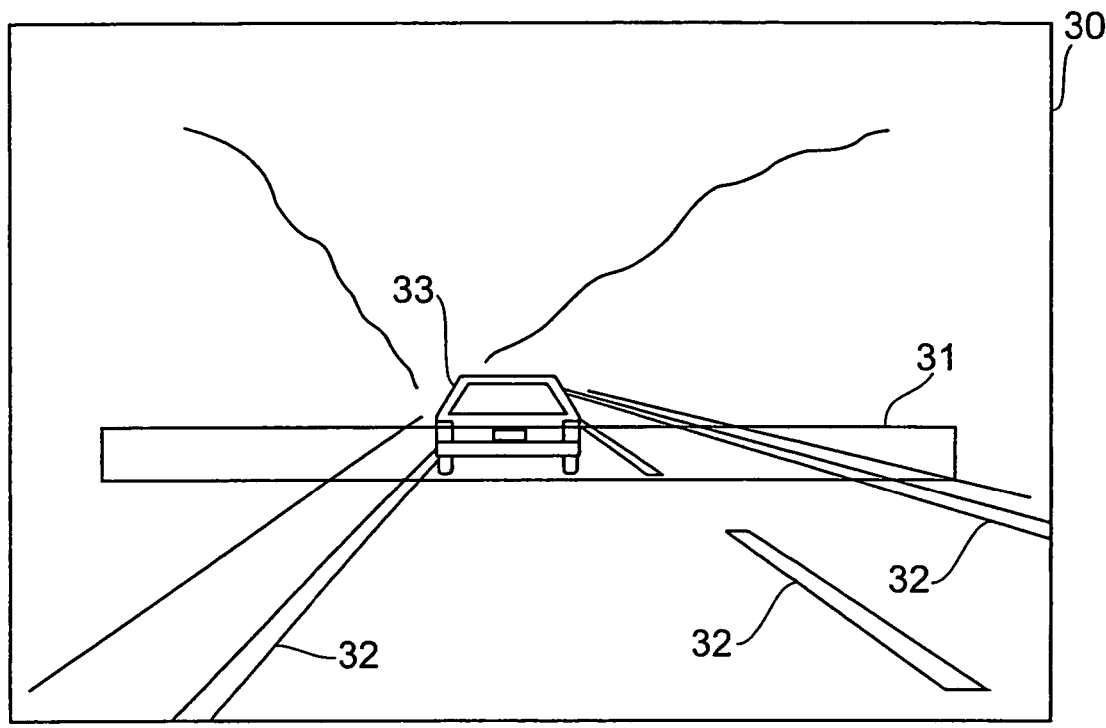
FIG. 3 is an illustration showing a photographic image taken by an image taking part 2 in the obstacle recognition system of FIG. 1.
Figure 4:
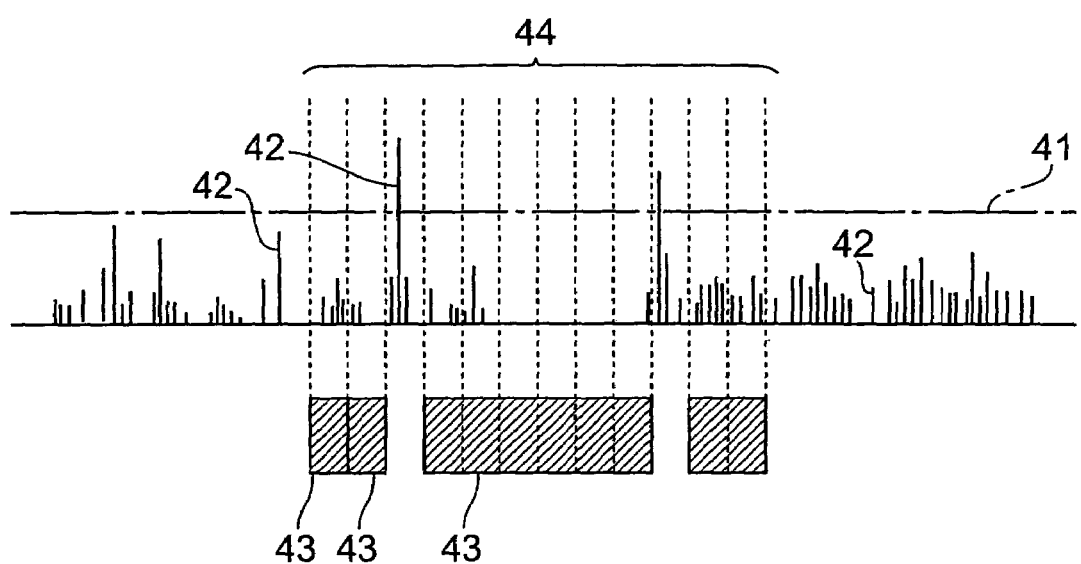
FIG. 4 is an illustration to illustrate a control processing content in the flowchart of FIG. 2.

For example, as shown in FIG. 3, a predetermined image processing region 31 is set in the photographic image 30 of the image taking part 2, and the vertical edge processing is carried out in the whole of this image processing region 31. Then, as shown in FIG. 4, a vertical edge density distribution is created based on edge points obtained by the edge processing. This edge density distribution is a histogram in which edge points are arranged in the lateral direction. In this FIG. 4, the edge points in the histogram include all edge points of lane markers 32, a part of vehicle 33, etc. in the photographic image 30. The lateral direction of this edge density distribution in FIG. 4 corresponds to the lateral direction of the photographic image 30 in FIG. 3. The vehicle 33 is another car traveling ahead the vehicle 5 being a host vehicle, and can be an obstacle to travel of the host vehicle.

A predetermined threshold 41 is set in the edge density distribution of FIG. 4. When a histogram level 42 at an edge point is below the threshold 41, an obstacle absence flag 43 is set On that occasion, as a detection area 44 for obstacle absence flag 43, it is preferable to set a region where a vehicle can be estimated to exist based on the output of the radar 3, instead of the region corresponding to the whole of the image processing region 31. By limiting the detection area 44 in this manner, it is feasible to reduce the processing amount of the arithmetic operation and to shorten the processing time of the arithmetic operation. This detection area 44 is preferably set based on the distance from the vehicle 5 to the object (other car) and the relative position of the object to the vehicle 5.

This detection area 44 is divided into a plurality of subregions (regions separated by vertical dashed lines in FIG. 4). For example, twelve subregions are set in the detection area 44. It is then determined for each of the subregions whether a histogram level 42 exceeds the threshold 41, and an obstacle absence flag 43 is set in each subregion where the histogram level 42 is below the threshold 41.

On the other hand, the obstacle presence flag operation is a process of computing obstacle presence flags on the basis of the edge points obtained through the vertical edge processing of the photographic image of the image taking part 2. An obstacle presence flag is a flag indicating a possibility of presence of an obstacle on a road on the basis of the image information. The more the obstacle presence flags are set, the higher the possibility of the presence of the obstacle is.

For example, edge points concerning lane markers 32 are removed from the edge points obtained by the aforementioned obstacle absence flag operation, to extract obstacle edge points. This edge point removing process about lane markers 32 may be carried out by removing all edge points as a pair of a rise edge and a fall edge from the edge points obtained by the obstacle absence flag operation.

Figure 5:
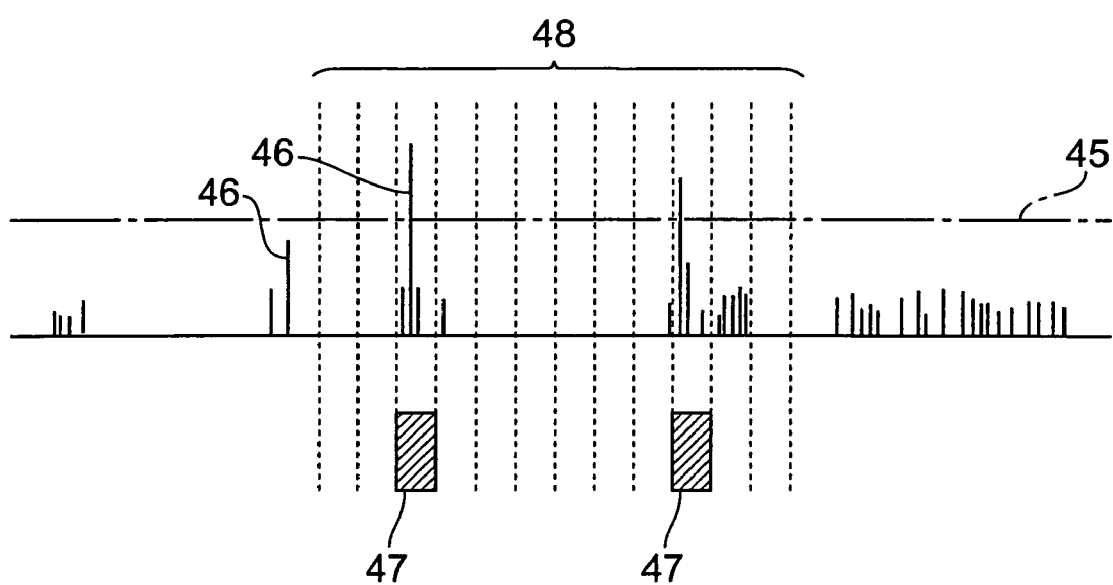
FIG. 5 is an illustration to illustrate a control processing content in the flowchart of FIG. 2.

Then, as shown in FIG. 5, an edge density distribution is created as to the obstacle edge points. This edge density distribution is a histogram in which the obstacle edge points are arranged in the lateral direction. The lateral direction of this edge density distribution in FIG. 5 corresponds to the lateral direction of the photographic image 30 in FIG. 3.

A predetermined threshold 45 is set in the edge density distribution of FIG. 5. When a histogram level 46 at an obstacle edge point exceeds the threshold 45, an obstacle presence flag 47 is set On that occasion, as a detection area 48 for obstacle presence flag 47, it is preferable to set a region where a vehicle can be estimated to exist based on the output of the radar 3, instead of the region corresponding to the whole of the image processing region 31. By limiting the detection area 48 in this manner, it is feasible to reduce the processing amount of the arithmetic operation and to shorten the processing time of the arithmetic operation.

For example, a plurality of subregions are set in this detection area 48. It is then determined for each of the subregions whether the histogram level 46 exceeds the threshold 45, and an obstacle presence flag 47 is set in each subregion where the histogram level 46 exceeds the threshold 45.

Then the ECU 4 moves to S18 in FIG. 2 to determine whether an obstacle absence flag is set. This determination is made based on whether the obstacle absence flag 43 is set in all the subregions in FIG. 4, in the image edge arithmetic operation at S16. Since in FIG. 4 the obstacle absence flag 43 is not set in all the subregions, the determination process at S18 results in determining that the obstacle absence flag is not set When the obstacle absence flag 43 is set in all the subregions on the other hand, the determination process at S18 results in determining that the obstacle absence flag is set.

When the obstacle absence flag is set at S18, it is determined that the possibility of the absence of the obstacle is high, and a threshold increase process is carried out (S24). This threshold increase process is a process of setting the determination threshold (criterion value) for determining the presence/absence of the obstacle, at a higher value so as to make an object on a road less likely to be determined as an obstacle in the obstacle detection process of detecting the obstacle to travel of the vehicle on the basis of the output of the radar 3.

For example, in a case where a determination threshold is set for the output of the radar 3 and where it is determined that an obstacle is present when the output exceeds the determination threshold, the determination threshold is switched to a higher threshold value to make an object on a road less likely to be determined as an obstacle.

When the obstacle absence flag is not set at S18, it is determined that the possibility of the absence of the obstacle is not low, and it is determined whether the obstacle presence flag is set (S20). This determination is made, for example, based on whether the obstacle presence flag 47 in FIG. 5 is set in a predetermined number of subregions or more, in the image edge arithmetic operation at S16. The predetermined number herein is preferably set to 2. In this case, since the obstacle presence flag 47 is set in two subregions in FIG. 5, it is determined in the determination process at S20 that the obstacle presence flag is set On the other hand, when the obstacle presence flag 47 is not set in two or more subregions, it is determined in the determination process at S20 that the obstacle presence flag is not set When the obstacle presence flag is not set at S20, it is determined that the possibility of the presence of the obstacle is low, and the control processing is terminated. When the obstacle presence flag is set at S20 on the other hand, it is determined that the possibility of the presence of the obstacle is high, and a threshold decrease process is carried out (S22). This threshold decrease process is a process of setting the determination threshold (criterion value) for determining the presence/absence of the obstacle, at a lower value so as to make an object on a road more likely to be determined as an obstacle, in the obstacle detection process of detecting the obstacle to travel of the vehicle on the basis of the output of the radar 3.

For example, in a case where a high threshold is set for the output of the radar 3, the determination threshold is switched to a lower threshold value. This makes an object on a road more likely to be determined as an obstacle.

Figure 6:
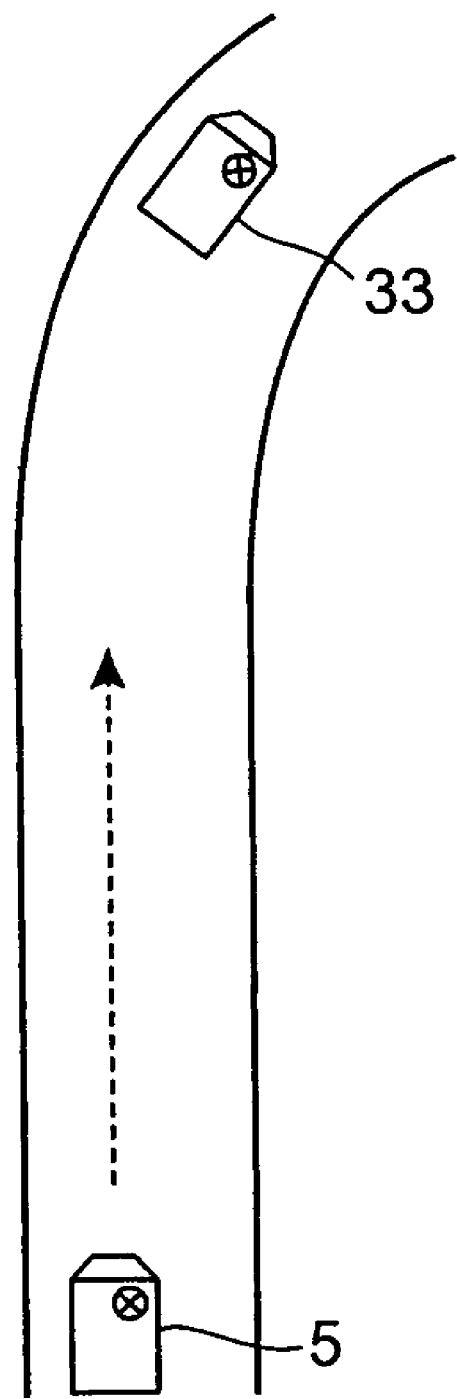
FIG. 6 is an illustration to illustrate a control processing content in the flowchart of FIG. 2.
Figure 7:
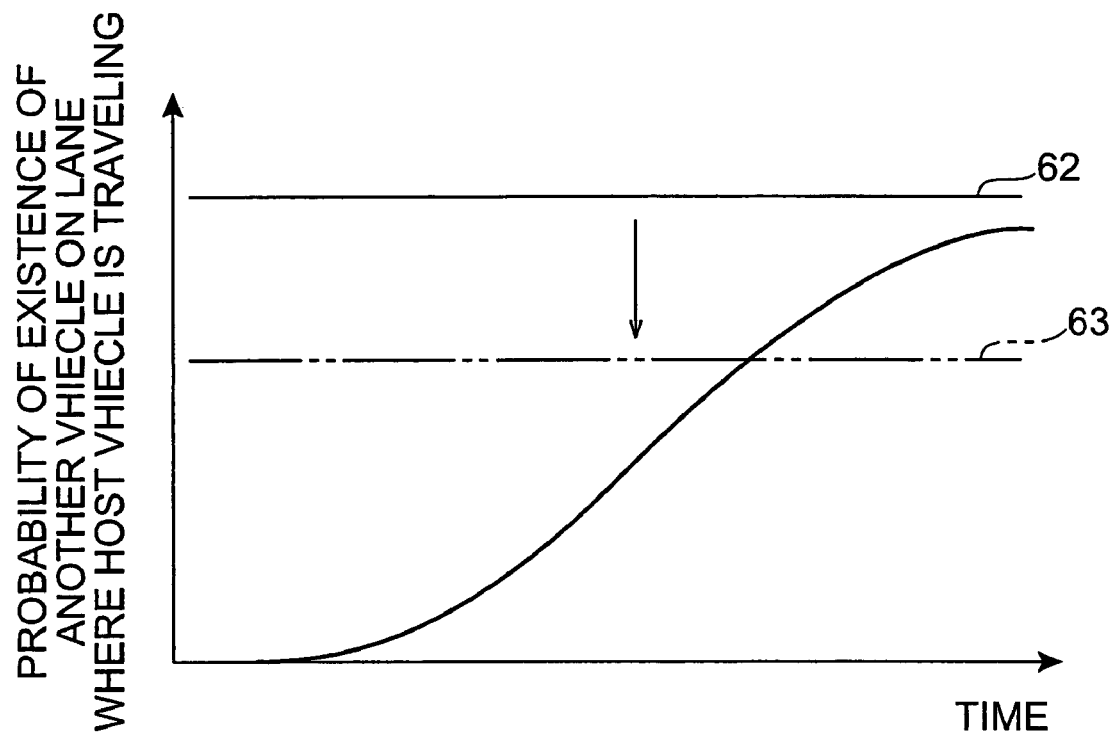
FIG. 7 is an illustration to illustrate a control processing content in the flowchart of FIG. 2.

With a specific example, as shown in FIG. 6, there is a curve ahead a road where the host vehicle 5 is traveling, and another vehicle 33 is traveling on the curve; there is a case where it is desired to determine whether the other vehicle 33 is on the same lane as the host vehicle. In this case, as shown in FIG. 7, a probability of making a determination that the other vehicle 33 is on the same lane as the host vehicle is low at first, but the probability increases as the host vehicle approaches the other vehicle 33. At this time, a high criterion value 62 is set for the output of the radar 3. Since it is difficult to detect the width of the forward obstacle with the radar 3, the determination is made in a secure state in order to avoid unwanted actuation of the system. On the other hand, in a case where two edges are present ahead on the basis of the image information, where the size is estimated from the width thereof, and where it is anticipated that a vehicle or the like is present, the high criterion value 62 is changed to a low criterion value 63. This makes an object on a road more likely to be determined as an obstacle.

Then the ECU 4 moves to S26 in FIG. 2 to perform an obstacle detection process. This obstacle detection process is a process of detecting an obstacle to travel of the vehicle on the basis of the output of the radar 3. For example, as shown in FIG. 7, whether an obstacle is present is determined based on whether the output 61 of the radar 3 exceeds the determination threshold 62 or 63 set at S22 or 24. Namely, when the low determination threshold 62 is set as the determination threshold and when the output 61 of the radar 3 exceeds the determination threshold 62, it is determined that an obstacle is present. When the output 61 of the radar 3 is below the determination threshold 62 on the other hand, it is determined that no obstacle is present.

Then the ECU 4 moves to S28 to perform a collision avoiding/relieving process. The collision avoiding/relieving process is a process of avoiding a collision of the vehicle 5 with the obstacle or relieving influence of the collision. Namely, in this collision avoiding/relieving process, the collision avoidance or collision influence relief is activated earlier when the presence of the obstacle is detected, than when the absence of the obstacle is detected. For example, when the presence of the obstacle is detected, a control system is initiated earlier in brake control of effecting automatic braking for collision avoidance or in steering control of effecting automatic steering for collision avoidance. In addition, when the presence of the obstacle is detected, a control system is initiated earlier in seat belt control of automatically retracting the seat belts for relieving the influence of the collision, in seat control of automatically moving the seats, in headrest control of automatically moving the headrests, or in suspension control of automatically changing a suspension characteristic.

A warning process of issuing a warning on the presence of the obstacle to the driver of the vehicle 5 may be carried out as the collision avoiding/relieving process at S28. It is preferable to issue a warning on the presence of the obstacle ahead the vehicle through visual sensation, auditory sensation, or tactual sensation to the driver, for example, by turning on a lamp, by outputting a sound, or the like, prior to the initiation of the automatic braking or the like described above.

As described above, the obstacle recognition system and obstacle recognition method according to the present embodiment are arranged to change the determination threshold in the obstacle detection on the basis of the image information, so that they can set the criterion value at the high value with the possibility of the presence of the obstacle being low or set the criterion value at the low value with the possibility of the presence of the obstacle being high, on the basis of the image information in the obstacle detection based on the output of the radar 3. This makes it feasible to prevent unwanted actuation of the system with the low possibility of the presence of the obstacle and to more securely actuate the system with the high possibility of the presence of the obstacle. This achieves appropriate actuation of the system.

It also becomes feasible to prevent incorrect detection of the obstacle with the low possibility of the presence of the obstacle and to securely detect the obstacle with the high possibility of the presence of the obstacle. This achieves appropriate recognition of the obstacle.

For example, where there is a metal bump or the like on the road ahead the vehicle, the radar 3 might detect it as an obstacle. Namely, if the detection area by the radar 3 is set ahead the vehicle on the assumption that there is no other vehicle or the like ahead the vehicle within the predetermined range on the basis of the image information, the radar 3 can recognize a metal bump or a metal plate on the road, as an obstacle with a high possibility.

In contrast to it, the obstacle recognition system and obstacle recognition method according to the present embodiment are arranged to set the determination threshold for the obstacle detection by the radar 3 at the high value when the possibility of the presence of the obstacle is determined to be low based on the image information. For this reason, they are able to prevent an object posing no impediment to drive of the vehicle, such as a metal bump, from being detected as an obstacle, and thus they are able to detect a real obstacle to drive of the vehicle, thus implementing appropriate detection of the obstacle.

Furthermore, the obstacle recognition system and obstacle recognition method according to the present embodiment are arranged to, with detection of an obstacle, expedite the activation of the collision avoidance or collision influence relief with the obstacle. This can raise the possibility of avoidance of the collision with the obstacle, or relieve the influence of the collision.

The present embodiment described the case where the criterion value was changed so as to make the obstacle less likely to be detected with increase in the estimated possibility of the absence of the obstacle on the basis of the image information and where the criterion value was changed so as to make the obstacle more likely to be detected with increase in the estimated possibility of the presence of the obstacle on the basis of the image information, but it is also possible to adopt a configuration wherein the collision avoidance or collision influence relief is activated earlier when the possibility of the presence of the obstacle is estimated to be high based on the image information than when the possibility of the presence of the obstacle is estimated not to be high. For example, in the flowchart of FIG. 2, the collision avoidance or collision influence relief is activated earlier when it is determined at S20 that the obstacle presence flag is set than when it is determined at S18 that the obstacle absence flag is set This can enhance the possibility of avoidance of a collision with the obstacle, or relieve the influence of the collision.

What is claimed is:

1. An obstacle recognition system comprising:
    a radar for detecting existence of an object around a vehicle;
    an image taking device for taking an image of the object;
    an obstacle detecting element for detecting an obstacle to travel of the vehicle on the basis of an output from the radar; and
    a criterion value changing element for selectively raising and lowering a criterion value in the obstacle detection of the obstacle detecting element on the basis of image information of the image taken by the image taking device, wherein when an obstacle indication is provided based on the image of the object, and a possibility of a presence of the obstacle is higher than a threshold value, the criterion value changing element reduces a determination threshold of detecting the obstacle, in order to change a likelihood of detecting the obstacle, and when the obstacle indication is provided based on the image of the object, and the possibility of the presence of the obstacle is low, the criterion value changing element increases the determination threshold of detecting the obstacle to change the likelihood of detecting the obstacle;
    an electronic control unit performing an obstacle absence flag operation and an obstacle presence flag operation based on the image of the object taken by the image taking device and estimating a magnitude that the determination threshold of detecting the obstacle should change based on a calculation of the number of obstacle absence flags and obstacle presence flags set; and
    a collision avoidance/relieving unit responsive to detection of a possible collision with the object, comprising at least one selected from the group consisting of an automatic brake control actuator, an automatic steering control actuator, an automatic head rest position movement actuator, or an automatic vehicle suspension characteristic change actuator;
    wherein a possibility of an activation of the collision avoidance/relieving unit is reduced when the possibility of the presence of the obstacle is lower than the threshold value, and the possibility of activation of the collision avoidance/relieving unit is increased when the possibility of the presence of the obstacle is higher than the threshold value.

2. The obstacle recognition system according to claim 1, further comprising an obstacle estimating element for estimating presence of the obstacle on the basis of the image information,
    wherein the criterion value changing element selectively raises and lowers the criterion value on the basis of a possibility of the presence of the obstacle estimated by the obstacle estimating element.

3. The obstacle recognition system according to claim 2, wherein the obstacle estimating element sets a detection area in the image on the basis of the output from the radar and estimates the presence of the obstacle in the detection area on the basis of the image information.

4. The obstacle recognition system according to claim 3, wherein the detection area set by the obstacle estimating element is set based on a distance from the vehicle to the object and a relative position of the object to the vehicle.

5. The obstacle recognition system according to any one of claims 2 to 4, wherein the obstacle estimating element estimates the presence of the obstacle on the basis of an edge density distribution obtained through image processing of the image.

6. The obstacle recognition system according to any one of claims 2 to 4, wherein the obstacle estimating element calculates a possibility of absence of the obstacle on the basis of entire edge data obtained through image processing of a predetermined region in the image, calculates the possibility of the presence of the obstacle on the basis of edge data resulting from subtraction of edge data of lane markers from the entire edge data, and estimates the presence of the obstacle on the basis of the possibility of the absence of the obstacle and the possibility of the presence of the obstacle.

7. The obstacle recognition system according to any one of claims 1 to 4, wherein the criterion value changing element selectively raises and lowers the criterion value so that the obstacle becomes less likely to be detected as a possibility of absence of the obstacle is estimated to be higher based on the image information.

8. The obstacle recognition system according to any one of claims 1 to 4, wherein the criterion value changing element selectively raises and lowers the criterion value so that the obstacle becomes more likely to be detected as a possibility of presence of the obstacle is estimated to be higher based on the image information.

9. The obstacle recognition system according to any one of claims 2 to 4, further comprising a collision avoiding/relieving element for avoiding a collision with the obstacle or for relieving influence of the collision,
wherein the collision avoidance of collision influence relief by the collision avoiding/relieving element is activated earlier when the obstacle estimating element estimates that the possibility of the presence of the obstacle is high than when the obstacle estimating element estimates that the possibility of the presence of the obstacle is not high.

10. The obstacle recognition system according to claim 1, wherein when the obstacle indication is not provided, and the possibility of the presence of the obstacle is low, operation of the criterion value changing element is terminated.

11. The obstacle recognition system according to claim 1, further comprising an alarm configured to provide a warning to a vehicle occupant of an impending collision with the object, said warning being at least one of a visual, audible, or tactile warning signal.

12. The obstacle recognition system according to claim 1, wherein the collision avoidance relieving unit further includes an automatic seat belt retraction actuator.

13. An obstacle recognition method comprising:
taking an image by an information taking device in a vehicle;
a criterion value changing step of selectively raising and lowering a criterion value in obstacle detection on the basis of image information of the image taken by the image taking device in order to change a likelihood of detecting the obstacle;
an obstacle flag detection step of detecting an obstacle absence flag operation and an obstacle presence flag operation based on the image by the information taking device and estimating a magnitude that the criterion value should change based on a calculation of the number of obstacle absence flags and obstacle presence flags set; and
an obstacle detecting step of detecting an obstacle to travel of the vehicle on the basis of an output from a radar for detecting existence of an object by use of the criterion value set in the criterion value changing step.

14. The obstacle recognition method according to claim 13, further comprising an obstacle estimating step of estimating presence of the obstacle on the basis of the image information,
wherein the criterion value changing step comprises selectively raising and lowering the criterion value on the basis of a possibility of the presence of the obstacle estimated in the obstacle estimating step.

15. The obstacle recognition method according to claim 14, wherein the obstacle estimating step comprises setting a detection area in the image on the basis of the output from the radar and estimating the presence of the obstacle in the detection area on the basis of the image information.

16. The obstacle recognition method according to claim 15, wherein the detection area in the obstacle estimating step is set based on a distance from the vehicle to the object and the relative position of the object to the vehicle.

17. The obstacle recognition method according to any one of claims 14 to 16, wherein the obstacle estimating step comprises estimating the presence of the obstacle on the basis of an edge density distribution obtained through image processing of the image.

18. The obstacle recognition method according to any one of claims 14 to 16, wherein the obstacle estimating step comprises calculating a possibility of absence of the obstacle on the basis of entire edge data obtained through image processing of a predetermined region in the image, calculating the possibility of the presence of the obstacle.

19. The obstacle recognition method according to any one of claims 13 to 16, wherein the criterion value changing step comprises selectively raising and lowering the criterion value so that the obstacle becomes less likely to be detected as a possibility of absence of the obstacle is estimated to be higher based on the image information.

20. The obstacle recognition method according to claim 13, wherein the criterion value changing step comprises selectively raising and lowering the criterion value so that the obstacle becomes more likely to be detected as a possibility of presence of the obstacle is estimated to be higher based on the image information.

21. The obstacle recognition method according to any one of claims 14 to 16, further comprising a collision avoiding/relieving step of avoiding a collision with the obstacle or relieving influence of the collision,
wherein the collision avoidance or collision influence relief in the collision avoiding/relieving step is activated earlier when the possibility of the presence of the obstacle is estimated to be high in the obstacle estimating step than when the possibility of the presence of the obstacle is estimated not to be high.

22. An obstacle recognition system comprising:
a radar for detecting existence of an object around a vehicle;
an image taking device for taking an image of the object;
an obstacle detecting element for detecting an obstacle to travel of the vehicle on the basis of an output from the radar; and
a criterion value changing element for selectively raising and lowering a criterion value in the obstacle detection of the obstacle detecting element on the basis of image information of the image taken by the image taking device, wherein when an obstacle indication is provided based on the image of the object, and a possibility of a presence of the obstacle is higher than a threshold value, the criterion value changing element reduces a determination threshold of detecting the obstacle, in order to change a likelihood of detecting the obstacle, and when the obstacle indication is provided based on the image of the object, and the possibility of the presence of the obstacle is low, the criterion value changing element increases the determination threshold of detecting the obstacle to change the likelihood of detecting the obstacle;

an electronic control element performing an obstacle absence flap operation and an obstacle presence flag operation based on the image of the object taken by the image taking device and estimating a magnitude that the determination threshold of detecting the obstacle should change based on a calculation of the number of obstacle absence flags and obstacle presence flags set; and a collision avoidance/relieving unit responsive to detection of a possible collision with the object, comprising at least one selected from the group consisting of an automatic brake control actuator, an automatic steering control actuator, an automatic head rest position movement actuator, or an automatic vehicle suspension characteristic change actuator.

23. The obstacle recognition system according to claim 22, wherein a possibility of an activation of the collision avoidance/relieving unit is reduced when the possibility of the presence of the obstacle is lower than the threshold value, and the possibility of activation of the collision avoidance/relieving unit is increased when the possibility of the presence of the obstacle is higher than the threshold value.

24. The obstacle recognition system according to claim 22, wherein a possibility of an activation of the collision avoidance/relieving unit is reduced when the possibility of the presence of the obstacle is lower than the threshold value, and the possibility of activation of the collision avoidance/relieving unit is increased when the possibility of the presence of the obstacle is higher than the threshold value.

25. The obstacle recognition system according to claim 22, wherein the collision avoidance relieving unit further includes an automatic seat belt retraction actuator.

* * * * *

UNITED STATES PATENT AND TRADEMARK OFFICE
CERTIFICATE OF CORRECTION

PATENT NO. : 7,570,198 B2 Page 1 of 1
APPLICATION NO. : 11/142244
DATED : August 4, 2009
INVENTOR(S) : Setsuo Tokoro It is certified that error appears in the above-identified patent and that said Letters Patent is hereby corrected as shown below:

In claim 22, column 13, line 8, "flap" should read --flag--.

Signed and Sealed this

Twentieth Day of October, 2009

David J. Kappos
*Director of the United States Patent and Trademark Office*